C. A. NELSON.
ROD SPLICE.
APPLICATION FILED JAN. 30, 1919.
1,368,191.
Patented Feb. 8, 1921.
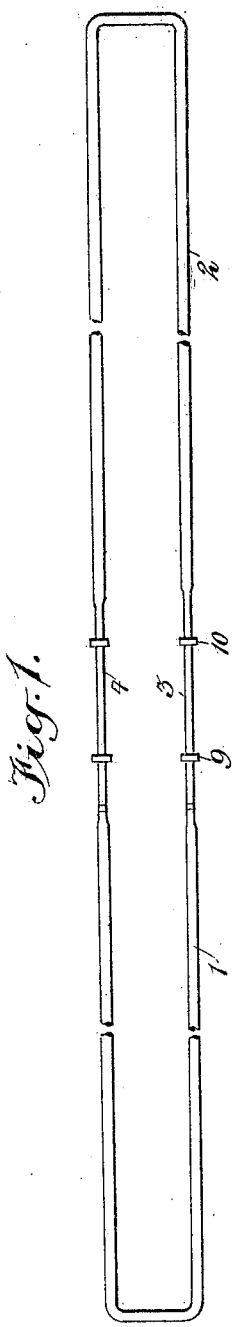
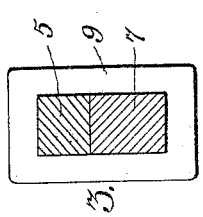
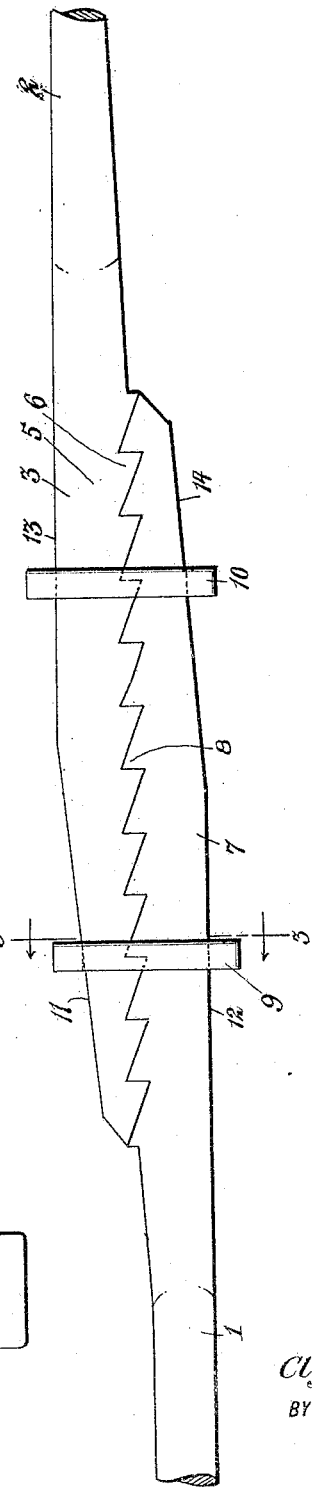
WITNESSES
INVENTOR
Clyde A. Nelson
BY
ATTORNEYS

UNITED STATES PATENT OFFICE.

CLYDE A. NELSON, OF CRISTOBAL, CANAL ZONE, PANAMA.

ROD-SPLICE.

1,368,191.   Specification of Letters Patent.   Patented Feb. 8, 1921.

Application filed January 30, 1919. Serial No. 273,997.

*To all whom it may concern:*

Be it known that I, CLYDE A. NELSON, a citizen of the United States, and a resident of Cristobal, Canal Zone, Panama, have invented a new and Improved Rod-Splice, of which the following is a full, clear, and exact description.

This invention relates to splices for rods and particularly to an improved construction for splicing reinforcing rods for concrete. The object in view is to provide a rigid splice for rods whereby there is no danger of slipping when cast with concrete.

Another object in view is to provide a splice which will be quickly adjusted and then firmly clamped so as to not slip either during the time when being placed in position or afterward.

In the accompanying drawing:

Figure 1 is a plan view of a pair of U-shaped concrete reinforcing rods shown supplied with the splice disclosing an embodiment of the invention.

Fig. 2 is a side view on an enlarged scale of the splice shown in Fig. 1.

Fig. 3 is a section through Fig. 2 on line 3—3.

Referring to the accompanying drawing by numerals 1 and 2 indicate U-shaped rods used in reinforcing concrete, said rods being provided with splices 3 and 4 whereby they are held firmly together. These splices are constructed as shown more in detail in Fig. 2. In this figure it will be seen that the rod 2 is provided with an enlargement 5 having teeth 6, while rod 1 is provided with an enlargement 7 having teeth 8 adapted to interlock with teeth 6. These teeth are all of the same size so that the rods 1 and 2 may be adjusted to produce any desired length and then the rings or locking clips 9 and 10 are forced up the beveled ways 11, 12, 13 and 14. Preferably these rings are forced tightly against the beveled ways by a hammer or other means so as not to become readily disengaged. This will cause a proper splicing of the respective bars when used in reinforced concrete or in any other place when used in connection with U-shaped bars or straight bars. By forming an integral interlocking structure as shown in Fig. 2 a splice is produced which will develop more strength than any other portion of the rod, while at the same time presenting a very easy adjustment.

What I claim is:

1. A reinforcing structure for concrete comprising a pair of U-shaped bars, each bar having a pair of enlarged ends, with each end formed with teeth arranged in a straight line so that the ends of one bar may interlock with the ends of the other bar and may be adjusted so as to produce different lengths, said teeth each having one slanted or wedge-shaped face, said enlargements having inclined backs, and a pair of clamping rings for each set of enlargements, said clamping rings being adapted to be forced up said inclined backs so as to clamp said teeth together.

2. A reinforcing structure, comprising a pair of bars, each with an enlarged end provided with teeth arranged in a straight line so that the end of one bar may interlock with the end of the other and may be adjusted to produce different lengths, said enlargements having inclined backs; and a pair of clamping rings to be forced up said inclined backs to clamp said teeth together.

CLYDE A. NELSON.